…

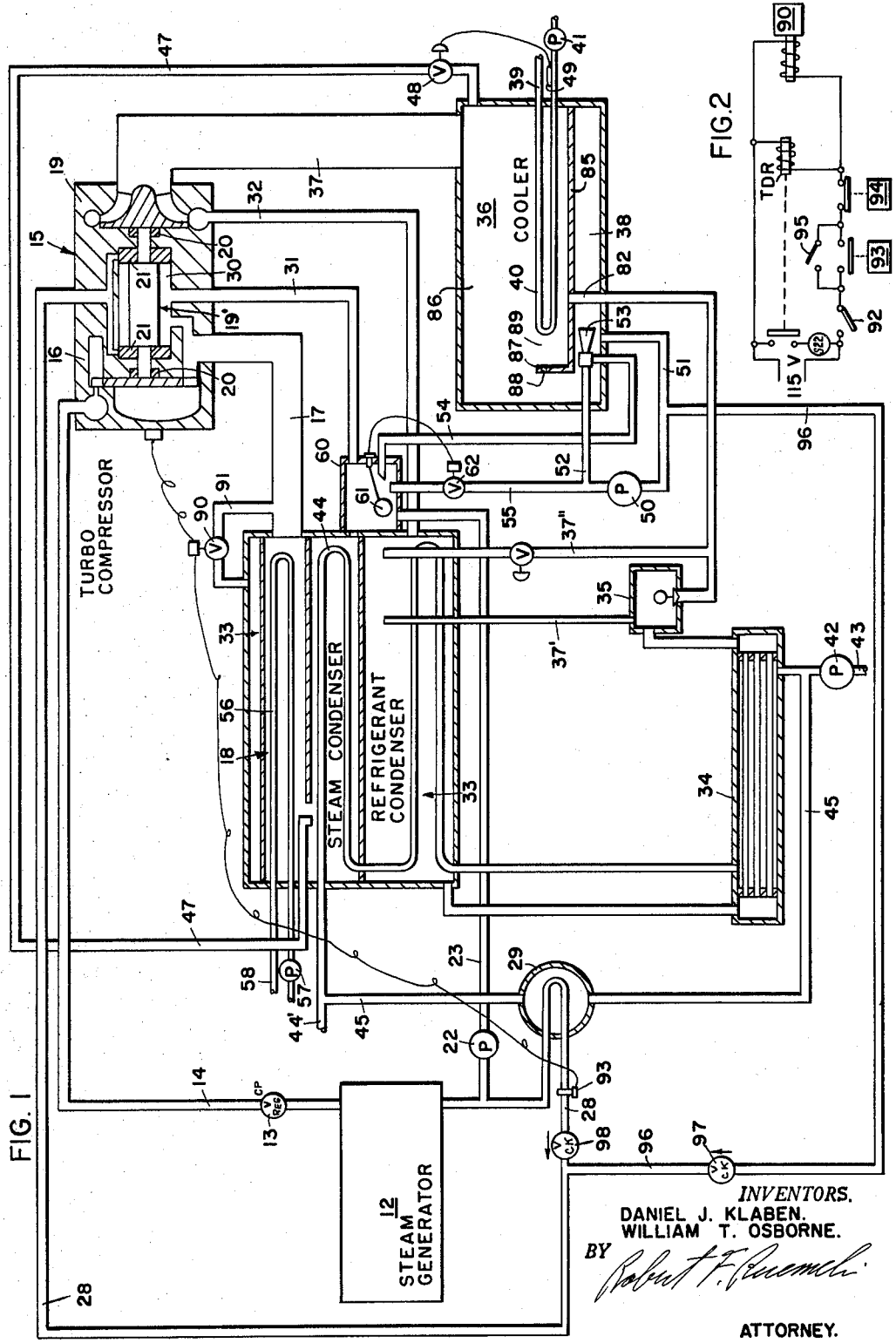

United States Patent Office 3,250,082
Patented May 10, 1966

3,250,082
REFRIGERATION SYSTEM LUBRICATION
Daniel J. Klaben, Solvay, and William T. Osborne, Syracuse, N.Y., assignors to Carrier Corporation, Syracuse, N.Y., a corporation of Delaware
Filed June 23, 1964, Ser. No. 377,328
12 Claims. (Cl. 62—84)

This invention relates to the lubrication of components of a refrigeration system and, more particularly, to auxiliary lubrication of turbocompressor bearings should normally operative lubricating means fail to provide adequate lubrication during shutdown of the system.

Various expedients are well known in the art for lubricating compressor or turbocompressor bearings during normal operation of a refrigeration system. Many refrigeration systems are electrically controlled, and in the event of a power failure the system shuts down. However, during such shutdown, the lubricant pump usually immediately stops operating, so that the bearings may be without adequate lubrication as the compressor or turbocompressor coasts to a stop. It may also happen that the lubricant pump ceases to function properly, for example, should its impeller break loose from the drive shaft. Some means responsive to loss of adequate lubrication of the bearings is usually provided to shut down the refrigeration system, but, during the shutdown period the bearings may receive little or no lubricant, and thus be damaged.

In a copending United States patent application of Louis H. Leonard for a "Heating and Cooling System," Serial No. 377,258, filed June 23, 1964, a heating and cooling system is disclosed wherein a steam driven turbocompressor has water lubricated bearings, preferably lubricated with steam condensate circulated by means of an electrically powered pump, and reference may be had to this application for a more complete description of the system. During normal shutdown operation, the pump is maintained in operation during the time required for the turbocompressor to coast to a stop, so that the bearings are adequately lubricated.

It is a primary object of this invention to provide a new and improved refrigeration system and a method of providing refrigeration.

A further object is to provide a new and improved lubrication system and a method of providing lubrication in a refrigeration system. A related object is to provide for adequate lubrication during other than normal shutdown of the refrigeration system.

A still further object is provision of a new and improved electrically powered lubrication system in a refrigeration system, to assure adequate lubrication in the event of an electrical power failure or other malfunction of the normal lubrication system.

A still further object is provision of a new and improved refrigeration system having a steam condenser normally operating at a relatively low pressure, a cooler having a water sump normally at a pressure above the pressure of the steam condenser, a steam driven turbocompressor for discharging steam into the steam condenser and circulating refrigerant through the cooler, the turbocompressor having water lubricated bearings, a first supply circuit normally operable for passing steam condensate to the bearings to provide lubricating water for the bearings, and a normally inoperative second supply circuit, operable responsive to failure of the first supply circuit to provide adequate lubricating water for the bearings, for passing water from the cooler sump to the bearings to lubricate the bearings.

A still further object is the provision of a method of lubricating a refrigeration machine operable within a range of pressure and wherein the machine includes apparatus requiring lubrication, and means operable at an other pressure below the range of pressures and having communication with the apparatus components requiring lubrication, comprising the steps of, supplying lubricant to the apparatus through a first circuit during normal operation of the machine, and forwarding lubricant in response to the difference in pressure between the range of pressures of the machine and the other pressure upon a reduction of lubricant flow in the first circuit.

Additional objects and advantages of the invention will be apparent from the following description and drawings, in which:

FIGURE 1 is a flow diagram of a preferred embodiment of the invention in a refrigeration system; and FIGURE 2 is a portion of an electrical control circuit of the refrigeration system.

The invention is illustrated in the form of a refrigeration system or machine which may be considered as having a power side including a circuit for the circulation of a power fluid, a refrigerant side including a circuit for the flow of a refrigerant fluid upon operation of operating means driven by the power fluid, with the operation of the refrigeration system regulated by a control system.

The invention will be described with reference to a preferred power fluid, which is water, and a preferred refrigerant, which is octafluorocyclobutane, commonly referred to as C318 and having a chemical formula $C_4F_8$. These fluids are particularly preferred because of their relative immiscibility and because they are inherently highly stable and do not tend to decompose or chemically react with each other or other materials in the system, or cause or promote corrosion or undesirable by-products. Also, this refrigerant is a relatively noncondensible vapor at the temperatures and pressures at which the power fluid (water) condenses, as well as at the usual ambient atmospheric conditions of temperature and pressure. However, other power fluids and refrigerants having these desired chemical and physical properties may be utilized within the scope of this invention.

As illustrated in FIGURE 1 of the drawings, the power side includes a suitable steam generator 12 from which steam is regulated at a substantially constant pressure, for example 15 p.s.i.g. as controlled by a constant pressure regulating valve 13 in a steam supply line 14 to a turbocompressor 15 and, more particularly, to a turbine section 16. The turbine discharges steam through a discharge line 17 to a steam condenser 18 which is operable within a zone of pressure of about 27″ Hg (1½ p.s.i.a.) during cooling operation of the system. The turbocompressor 15 also includes a refrigerant compressor section 19 directly drivingly coupled with the turbine as by a shaft 19′. Flow restricting means in the form of labyrinth type seals as 20, retard leakage of steam and refrigerant between the turbine and compressor sides of the turbocompressor, and water lubricated bearings, as 21, mount the shaft 19′. First water supply means includes a steam condensate pump 22 which returns the steam condensate through a return line 23 from the steam condenser 18 to the steam generator 12 for recirculation through the power side of the system, and forwards steam condensate through a first lubricant water line 28 including a lubricant cooling heat exchanger 29, for lubricating the bearings 21. Leakage of steam and refrigerant within the turbocompressor, and water from the bearings 21, passes into a chamber 30 in the turbocompressor and through a drain line 31 to the steam condenser 18 so that the chamber pressure is substantially within the zone of pressure of the steam condenser.

The refrigerant side of the system includes the refrigerant compressor 19 for passing compressed refrigerant vapor through a discharge line 32 to a refrigerant condenser 33 which envelops the steam condenser 18 and effectively retards the entry of ambient air into the steam condenser and insulates the steam condenser. Condensed refrigerant passes from the refrigerant condenser 33 to a refrigerant subcooler 34 and through a suitable refrigerant flow restricting means, such as a float valve unit 35, and into an evaporator or cooler 36 from which the refrigerant vapor is withdrawn by the refrigerant compressor a suction line 37, thus completing the refrigerant circuit of the system. A suitable equalizer line 37' connects the float valve unit chamber and the refrigerant condenser, and a suitable hot gas bypass 37'' is provided. The portion of the refrigerant side between the compressor outlet and the float valve unit 35 defines a high side at a pressure (for example, 50 p.s.i.g.) above a low side between the float valve unit and the compressor inlet at a pressure of 5 p.s.i.g., for example. Thus the range of pressure of the refrigerant side (5 to 50 p.s.i.g., for example) is above the zone of pressure (27'' Hg or 1½ p.s.i.a., for example) of the steam condenser and the turbocompressor chamber 30. The cooler 36 includes a water supply sump 38 and provides means for separating water and refrigerant, as discussed later. A chilled water line 39 communicates with a tube bundle 40 in the cooler 36 for carrying a heat exchange medium, here in the form of chilled water, which is cooled by the refrigerant and circulated by a chilled water pump 41 to an area having a cooling requirement. The cooling capacity of the system varies in proportion to the compressor output.

A cooling tower or condensing water pump 42 circulates tower water through the inlet line 43 to the refrigerant sub-cooler 34 and into a condensing tube bundle in the refrigerant condenser 33 and then into a first condensing tube bundle 44 in the steam condenser 18 and back to the tower through an outlet line 44'. A branch line 45 in the condensing water inlet line 43 provides tower water to the lubricant water heat exchanger 29 for cooling the lubricant water, and this branch terminates in the return line 44' to the tower.

The control system regulates the cooling capacity of the system by varying the steam condenser pressure which is related to the condensing rate of steam discharged into the steam condenser 18. The condensing rate of the steam condenser is regulated by controlled blanketing of the first condensing tube bundle 44 with a noncondensible vapor, herein refrigerant vapor, introduced through a refrigerant line 47 from the cooler 36. The quantity of noncondensible vapor effectively blanketing the first condensing tube bundle 44 is regulated by a modulating refrigerant flow regulating valve 48 in the line 47. The valve 48 is actuated responsive to chilled water temperature by means of a temperature sensor 49 on the chilled water line 39. For example, as the cooling load drops, more refrigerant is introduced into the steam condenser 18, thus reducing the steam condensing rate to increase the steam condenser pressure and therefore the turbine back pressure to reduce the turbocompressor power output and refrigerant delivery rate to reduce the cooling capacity.

A purge system withdraws refrigerant vapor from the steam condenser 18 at a constant rate. Herein a constant speed water supply pump 50 has its inlet connected with the sump 38 by means of a water line 51 and its outlet connected by means of a water line 52 to operate a jet pump 53 in the sump. The jet pump 53 withdraws noncondensible vapor, and any water vapor carried thereby, from the steam condenser 18 through a purge line 54 opening into the throat of the jet pump. The water supply pump 50 further provides make-up water for the steam generator 12 through a make-up water line 55 between the water line 52 and the steam condenser 18.

A second steam condensing tube bundle 56 may be provided in the steam condenser 18 for heating of a heating medium, herein water, which is circulated through the bundle 56 and to a load to be heated by means of a heating water pump 57 in a heating line 58 communicating with the bundle. The bundle 56 is maintained effectively free of blanketing by refrigerant vapor to maintain its full condensing capacity and maximum heating of the heating medium, as described in the previously noted Leonard application.

The drain line 31 from the turbocompressor chamber 30, the make-up water line 55 and the condensate return line 23 open into a steam condensate chamber 60 of the steam condenser. Thus, the turbocompressor chamber 30, the steam discharge passage 17, the drain 31, and the steam condenser 18 are all at substantially the same pressure, that is, the steam condenser pressure (for example 27'' Hg) which is below atmospheric pressure during normal cooling operation.

The purge line 54 opens into the steam condensate chamber 60 at a level to withdraw steam condensate from the chamber should the condensate level rise too high. Responsive to a low condensate level in the condensate chamber, a float actuated sensor 61 in the chamber opens a normally closed shutoff valve 62 in the make-up water line 55 from the water supply pump 50, to maintain a minimum level of condensate in the chamber 60.

The cooler provides means for separating water and refrigerant and herein a cooler refrigerant inlet 82 from the float valve unit 35 opens into a pan 85 spaced above the bottom of the cooler shell which defines the water sump 38. The chiller water bundle 40 is in the pan 85 so that during normal cooling operation of the system, the bundle is flooded with boiling refrigerant. As the refrigerant vaporizes, it passes into a refrigerant chamber 86 in an upper portion of the cooler shell above the pan 85. During cooling operation of the system, hot water and refrigerant vapor from the steam condenser, and heat from pump work, maintain the sump at least 10° F. above the temperature in the refrigerant chamber 86, so that refrigerant at the pressure present in the cooler sump vaporizes. Refrigerant vapor in the sump passes upwardly about a left end wall 87 of the refrigerant pan 85 and into the refrigerant chamber 86 from which it is withdrawn through the suction line 37. Water vapor that condenses in the refrigerant chamber 86 collects on top of the liquid refrigerant in the pan 85 and passes to the left end of the pan from which it flows through a suitable weir or port 88 in the end wall 87 of the pan and into the sump 38. The chilled water tube bundle 40 is spaced inwardly from the left end wall 87 to form a relatively quite area 89 of liquid refrigerant upon which water in the pan collects at the weir. Thus, means is provided for separating water and refrigerant and returning the separated fluids for reuse in the system.

To shut down the system, the steam condenser 18 is fully blanketed with refrigerant vapor by opening a solenoid valve 90, commonly called in this instance a blast valve, in a refrigerant line 91 between the refrigerant condenser 33 and the steam discharge line 17 to the steam condenser. The blast valve is closed during normal operation of the system. As mentioned previously, the refrigerant condenser 33 normally operates at a pressure of about 50 p.s.i.g. and the steam condenser 18 normally operates at a pressure of about 27'' Hg (about 1½ p.s.i.a.), so that the steam condenser is quickly blanketed with refrigerant vapor to increase the turbine discharge pressure to substantially that of the steam supplied to the turbine (15 p.s.i.g.), so that the turbine stops, for example, about twenty seconds after the blast valve 90 is opened. The blast valve 90 is preferably electrically operated and is open when it is deenergized, and is held closed when energized. A 115 v. electrical control circuit is shown in FIGURE 2 in the open position during shutdown of the refrigeration system, and the blast valve may be manually actuated to shut down the system by opening a switch 92.

In order to protect the turbine bearings 21 upon a drop in the flow of lubricating water through the lubricant water line 28, a flow sensor 93 in the lubricant water line 28 opens an associated pair of contacts which are closed in the electrical circuit during cooling operation, to deenergize and thus open the blast valve. Various other emergency shutdown sensors such as a turbocompressor overspeed sensor 94, may be provided for opening contacts in the 115 v. circuit to deenergize the circuit or otherwise open the blast valve 90.

The steam condensate pump 22 is preferably electrically driven by a suitable starter S22 in the 115 v. control circuit. At start-up of the system, the switch 92 is closed, and a second switch 95, in parallel with the contacts of the flow sensor 93, is closed momentarily to permit the flow of lubricant water to build up and hold the flow sensor contacts closed. A time delay relay TDR is preferably provided for maintaining the steam condensate pump 22 in operation, for example, for about two minutes after the blast valve 90 is opened, to provide adequate lubricating water for the bearings 21 as the turbocompressor 15 coasts to a stop, for example, about twenty seconds after the blast valve 90 is opened. However, in the event of an electrical power failure, or a malfunction of the pump 22 such as its impeller breaking loose from the pump drive shaft, for example, adequate lubricating water may not pass through the lubricant water line 28 to the turbocompressor bearings 21 during the period between opening up the blast valve 90 (for example responsive to operation of the lubricant water flow sensor 93) and actual stopping of the turbocompressor, so that damage to the bearings might result.

To prevent such failure of flow of lubricant water to the turbocompressor bearings 21, an auxiliary, second water supply means is provided for assuring adequate lubricant for the bearings during the short period of time required for stopping operation of the turbocompressor. A second lubricant water supply line 96 is in direct communication with the cooler sump 38 through the water line 51, and with the first lubricant water supply line 28 downstream of the flow sensor 93. During normal cooling operation, the lubricant water may pass through the line 28 at any suitable pressure, for example 25 p.s.i.g., and the cooler set is at a pressure of about 5 p.s.i.g. When the blast valve 90 opens, the turbocompressor immediately begins slowing down whereupon the cooler pressure rises rapidly, for example to about 25 p.s.i.g. in six to seven seconds and to about 50 p.s.i.g. in twenty seconds. If the steam condensate pump 22 stops, or for any other reason the lubricant water pressure in the line 28 drops below cooler pressure, sump water will flow through the second lubricant water line 96 and through the first lubricant water line 28 to the turbocompressor bearings 21. Since lubricant water from the bearings 21 pass into the turbocompressor chamber 30 which is at steam condenser zone of pressure (27" Hg) and well below the lowest cooler pressure and range of pressure (5 to 50 p.s.i.g.) of the refrigerant side, water immediately flows from the sump 38 to the bearings 21 should the water pressure in the first lubricant water line 28 drop below cooler pressure of about 5 p.s.i.g.

In order to prevent steam condensate in the first lubricant water line 28 from causing reverse flow in the second line 96, that is, toward the cooler sump 38, a suitable flow control check valve 97 is provided in the second lubricant water line 96. Similarly, in the event that the steam condensate pump 22 fails to provide adequate lubricant water through the first lubricant water line 28, a flow control check valve 98 is provided in the line 28 between the juncture of the lines 28 and 96, and the flow sensor 93, so that all sump water passing through line 96 flows to the turbocompressor bearings 21, and reverse flow toward the pump 22 is prevented is the first line 28.

It should be noted that upon opening of the blast valve 90, the pressure in the steam condenser 18, and therefore in the turbocompressor chamber 30, rises rapidly from its normal operating pressure of 27" Hg vacuum to about 20" Hg in six to seven seconds, 15 p.s.i.g. in twenty seconds and 50 p.s.i.g. in sixty seconds. However, during the critical twenty seconds or so required for the turbocompressor 15 to stop, the cooler pressure is always substantially higher than the pressure in the turbocompressor chamber 30, so that auxiliary lubricant water flows from the cooler sump 38 to the bearings. Because steam condensate is substantially devoid of refrigerant and other impurities, as is understood in the art, it is preferable to use steam condensate for lubricating the bearings 21. However, cooler sump water is adequate for lubricating the bearings during emergency shutdown of the system.

Thus, adequate lubricant water is provided for the bearings under all system shutdown conditions including the electrical power failure. When sump water is used to lubricate the bearings, it passes from the bearings to the steam condensate chamber 60 and is returned to the cooler sump 38 through the purge line 54 upon again starting the system in operation.

While this invention has been described and illustrated in a preferred embodiment, it will be understood that the invention is not limited thereto since it may be otherwise embodied within the scope of the following claims.

We claim:
1. In a refrigeration system, the combination comprising, a steam condenser normally operating at a relatively low pressure, a cooler having a water sump normally at a pressure above the pressure of said steam condenser, a steam driven turbocompressor having water lubricated bearings, means for discharging steam from said turbocompressor into said steam condenser, means for circulating refrigerant from said turbocompressor through said cooler, first water supply means normally operable for passing steam condensate at a pressure above the cooler pressure from said steam condenser to said bearing to provide lubricating water for the bearings, means at substantially steam condenser pressure for receiving said lubricating water from said bearings and passing the lubricating water from said bearings to said steam condenser, and normally inoperative second water supply means operable responsive to the lubricating water pressure dropping below the cooler pressure, for passing water from said cooler sump to said bearings to lubricate the bearings.

2. The system of claim 1 wherein said first water supply means comprises a first water supply line for passing said steam condensate to said bearings, and first flow control means in said first line for effectively preventing water from said second water supply means flowing through said first supply line in a direction away from said bearings.

3. The system of claim 2 wherein said second water supply means includes a second water supply line between said cooler and said first line, and second flow control means for effectively preventing water from said first supply line flowing through said second supply line toward said cooler.

4. The system of claim 3 wherein said first and second flow control means comprise check valves.

5. The system of claim 1, wherein said first water supply means is electrically powered, whereby upon an electrical power failure stopping operation of said first water supply means, said bearings receive lubricating water from said second water supply means.

6. The system of claim 1, and means for passing water from said steam condenser to said sump.

7. In a refrigeration system, the combination comprising, a cooler having a sump for lubricant, a compressor having bearings requiring lubrication, means adapted to pass refrigerant from said compressor to said cooler for providing cooling during cooling operation of the system, first supply means operable for passing lubricant to said bearings during said cooling operation, and normally inoperative second supply means for passing lubricant from said cooler sump to said bearings upon failure of said first supply means to provide adequate lubricant for the bearings.

8. In a refrigeration system, the combination comprising, a steam condenser normally operating at a relatively low pressure, a cooler having a water sump normally at a pressure above the pressure of said steam condenser, a steam driven turbocompressor for discharging steam into said steam condenser and circulating refrigerant through said cooler, said turbocompressor having water lubricated bearings, first supply means normally operable for passing steam condensate from said steam condenser to said bearings to provide lubricating water for the bearings, and normally inoperative second supply means operable responsive to failure of said first supply means to provide adequate lubricating water for said bearings, for passing water from said cooler sump to said bearings to lubricate the bearings.

9. In a refrigeration system, the combination comprising, a steam condenser normally operating at a relatively low pressure, a cooler having a water sump normally at a pressure above the pressure of said steam condenser, a steam driven turbocompressor for discharging steam into said steam condenser and circulating refrigerant through said cooler, said turbocompressor having water lubricated bearings, first supply means including a pump for withdrawing steam condensate from said steam condenser and passing the condensate at a pressure above the cooler pressure through a first supply line to said bearings to provide lubricating water for the bearings, means at a pressure below the cooler pressure for receiving said lubricating water from said bearings and passing said lubricating water to said steam condenser, and normally inoperative second supply means for passing water from said sump to said bearings when said pressure of said first supply means is below the cooler pressure and including, a second supply line between said sump and said first supply line, a check valve in said first line between said second line and said pump for effectively preventing flow in said first line from said second line toward said pump, and a check valve in said second line for effectively preventing flow in said second line from said first line toward said sump.

10. The system of claim 9 wherein said pump is electrically powered, whereby said bearings are lubricated by water from the sump as the turbocompressor coasts to a stop following an electrical power failure.

11. A method of lubricating a refrigeration machine having a portion operable at a pressure to provide refrigeration and a component requiring lubrication during operation of the machine, and including a first circuit adapted to provide lubricant to the component requiring lubrication, and a second circuit adapted to provide lubricant to the component and including said portion, said method comprising providing refrigeration by operating said machine, lubricatng said component by supplying lubricant through said first circuit at a pressure higher than the pressure of said portion during normal operation of said first circuit, and lubricating said component by supplying lubricant through said second circuit under pressure from said portion when the pressure of said first circuit drops below the pressure of said portion.

12. A method according to claim 11 in which said portion is a cooler adapted to receive refrigerant which vaporizes in the cooler to provide said refrigeration and said component requiring lubrication is a turbocompressor adapted to be operated by a power fluid to withdraw the refrigerant vapor from the cooler, and said first circuit includes a condenser adapted to operate at a pressure lower than the cooler pressure and to receive the power fluid and lubricant discharged from said turbocompressor during operation of the machine to provide said refrigeration, and in which said turbocompressor is rendered inoperative to withdraw said refrigerant vapor from said cooler by increasing the condenser pressure when said higher pressure of said first circuit drops below the normal operating pressure of said cooler, said lubricant is passed to the turbocompressor as the turbocompressor stops by maintaining said cooler pressure above said condenser pressure.

References Cited by the Examiner

UNITED STATES PATENTS

| | | | |
|---|---|---|---|
| 1,647,135 | 11/1927 | Johnson | 184—6 |
| 2,900,801 | 8/1959 | Honegger | 62—84 |
| 3,048,158 | 8/1962 | Olson | 184—6 |
| 3,153,442 | 10/1964 | Silvern | 165—50 |

ROBERT A. O'LEARY, *Primary Examiner.*

W. E. WAYNER, *Assistant Examiner.*